(12) United States Patent
Noel et al.

(10) Patent No.: US 7,513,534 B2
(45) Date of Patent: Apr. 7, 2009

(54) FATIGUE-RESISTANT THREADED COMPONENT FOR A TUBULAR THREADED JOINT

(75) Inventors: Thierry Noel, Sebourg (FR); Gabriel Roussie, Mons en Baroeul (FR)

(73) Assignees: Vallourec Mannesmann Oil & Gas France, Aulnoye-Aymeries (FR); Sumitomo Metal Industries, Ltd., Osaka-Shi (JP)

( * ) Notice: Subject to any disclaimer, the term of this patent is extended or adjusted under 35 U.S.C. 154(b) by 0 days.

(21) Appl. No.: 10/469,839

(22) PCT Filed: Mar. 4, 2002

(86) PCT No.: PCT/FR02/00773

§ 371 (c)(1), (2), (4) Date: Sep. 5, 2003

(87) PCT Pub. No.: WO02/073076

PCT Pub. Date: Sep. 19, 2002

(65) Prior Publication Data

US 2004/0155465 A1 Aug. 12, 2004

(30) Foreign Application Priority Data

Mar. 9, 2003 (FR) .................................. 01/03249

(51) Int. Cl.
*F16L 15/00* (2006.01)
*F16L 15/06* (2006.01)

(52) U.S. Cl. ....................................... 285/334; 285/333
(58) Field of Classification Search ................. 285/333, 285/334, 355, 390
See application file for complete search history.

(56) References Cited

U.S. PATENT DOCUMENTS

| 2,245,419 | A | * | 6/1941 | Unke | 285/390 |
| 2,788,045 | A | * | 4/1957 | Rosan | 411/277 |
| 3,069,960 | A | * | 12/1962 | Baubles | 411/411 |
| 3,069,961 | A | * | 12/1962 | Baubles | 411/398 |
| 3,882,917 | A |  | 5/1975 | Orlomoski |  |
| 3,933,074 | A | * | 1/1976 | Witte et al. | 411/437 |
| RE30,647 | E | * | 6/1981 | Blose | 285/332.2 |
| 4,582,348 | A | * | 4/1986 | Dearden et al. | 285/148.19 |
| 4,629,222 | A | * | 12/1986 | Dearden et al. | 285/332.4 |

(Continued)

FOREIGN PATENT DOCUMENTS

EP 0 454 147 10/1991

(Continued)

*Primary Examiner*—James M Hewitt
(74) *Attorney, Agent, or Firm*—Oblon, Spivak, McClelland, Maier & Neustadt, P.C.

(57) ABSTRACT

A fatigue-resistant threaded element for a threaded tubular connection. A portion of threads of the threaded element have a helical groove opening into the threaded crest. A groove is formed in all or a portion of the threads of one or both end zones, namely the first engaged thread zone and the last engaged thread zone, and it is optionally formed in the threads of the medial thread zone. The groove reduces stiffness of threads carrying a groove in the end zone or zones compared with the stiffness of the threads in the medial thread zone. The threaded tubular connection obtained after making up the threaded element with a mating threaded element is much more resistant to cyclic tensile stress and/or axial compressive stresses and/or flexion stresses.

44 Claims, 6 Drawing Sheets

U.S. PATENT DOCUMENTS

| | | | | |
|---|---|---|---|---|
| 4,764,067 A | * | 8/1988 | Kawashima | 411/310 |
| 5,681,059 A | * | 10/1997 | Mackie | 285/94 |
| 5,687,999 A | * | 11/1997 | Lancry et al. | 285/333 |
| 6,216,510 B1 | * | 4/2001 | Hashimoto | 72/103 |
| 6,412,831 B1 | * | 7/2002 | Noel et al. | 285/334 |
| 6,481,760 B1 | * | 11/2002 | Noel et al. | 285/334 |
| 6,514,025 B2 | * | 2/2003 | Watanabe | 411/311 |

FOREIGN PATENT DOCUMENTS

| | | |
|---|---|---|
| EP | 0 482 266 | 4/1992 |
| EP | 0 488 912 | 6/1992 |
| WO | 00 14442 | 3/2000 |
| WO | WO 00/14441 | 3/2000 |

* cited by examiner

FATIGUE-RESISTANT THREADED COMPONENT FOR A TUBULAR THREADED JOINT

BACKGROUND OF THE INVENTION

1. Field of the Invention

The present invention relates to a male or female threaded element of a threaded tubular connection that is particularly capable of resisting both static and cyclic stresses, and to a threaded tubular connection that is particularly capable of resisting both static and cyclic stresses.

2. Discussion of the Background

Threaded tubular connections comprise a male threaded element at the end of a first pipe, generally a great-length pipe, and a threaded female element at the end of a second pipe, which may be a great-length tube or a coupling.

They are used to constitute casing strings or production strings or drilling strings for hydrocarbon wells or for similar wells such as geothermal wells.

Specifications 5B and 5CT from the American Petroleum Institute (API) define threaded connections between casing pipes or between production pipes with tapered threads.

Premium threaded tubular connections, which have sealing characteristics despite a wide variety of stresses, have been described, for example, in European patent EP 488 912 and in United States patent U.S. Pat. No. 5,687,999.

Such threaded connections can employ straight or tapered threads with one or two threaded portions.

Until very recently, casing or production strings essentially had to be capable of resisting different combinations of static stresses (axial tension, axial compression, planar flexion, internal pressure or external pressure) despite their limited thickness resulting from the necessity, in order to run a deep well, of nesting strings with different diameters one inside the other.

In contrast, drillpipes, which are only used to drill wells, are designed to resist substantial cyclic stresses but are not subjected to constraints on their internal space, as a single drillpipe string of a given diameter is lowered at a given time.

When drillpipe strings are in operation, if not strictly limited, cyclic stresses lead to fatigue cracking initiated at the thread root, generally on the side of the load flanks, more particularly at the last engaged threads of the threaded elements.

In the remainder of the present document, the term "first threads" is used to designate the threads which, in a longitudinal cross-section passing through the axis of the threaded element, are located on the side of the front end of the threaded element. Consequently, the last threads are those situated at the other end of the threading.

The term "engaged threads" means firstly, the threads of the threaded elements of a threaded tubular connection in the made up state which axially transfer the load from one threaded element to a mating threaded element, whether the threads are perfect (full height) or imperfect (incomplete or partial height, for example run-out or run-in threads). When the threaded connection is subjected to axial tensile stresses, which is generally the case, the engaged threads are those for which the load flanks are in contact.

By extension, the term "engaged threads" of an isolated threaded element means threads intended to transfer the load to the corresponding threads of a mating threaded element when these two threaded elements are connected to constitute a threaded tubular connection.

The position of the engaged threads of a threaded element is known from the design of the threaded element as this is a necessary datum for predicting the strength of the resulting threaded connection. The position of the last or first engaged threads can thus be completely defined on a threaded element intended to produce a threaded tubular connection.

The problem of fatigue behaviour, however, no longer applies solely to drilling strings but also for strings for running certain hydrocarbon wells wherein the threaded tubular connections that constitute such strings must be capable of supporting both high static stresses and cyclic stresses.

Such stress behavioural requirements are encountered in offshore strings connecting the seabed to offshore hydrocarbon production platforms.

Such strings, known as "risers" in the English-speaking language of the skilled person are subjected to cyclic stresses caused in particular by currents that cause the string to vibrate, by the swell, by the tide and any possible displacement of the platforms themselves.

Such stress behaviour is also encountered with onshore wells, in particular when lowering rotating pipes for cementing wells in the very frequent case of wells that deviate from the vertical and bend.

The prior art concerning threaded tubular or non-tubular connections (of the bolted type, for example) proposes means for improving the fatigue behaviour of threaded connections subjected to axial tensile loads that may vary in a cyclic fashion.

U.S. Pat. No. 3,933,074 describes a nut for a bolted connection wherein the internal threading is interrupted at the first engaged threads by a plurality of axial channels regularly disposed on the periphery of the threading to displace the maximum axial tensile stress transfer zone between the nut and screw from the first female engaged thread to the middle of the axial length of the nut.

Such channels, the length of which can be half the length of the threading and the depth of which can be as high as 80% of the thread height, increase the flexibility of the first engaged threads but reduce by about 20% the bearing surface of the threads in the zone in which they are formed, which is a disadvantage when high resistance to static stresses is required and the threaded tubular connection has to be sealed to the interior and exterior of the pipes.

Further, solutions for the bolts in which the nuts bear on the side of the first threads against the screw head (on the side of the last screw threads) are not necessarily directly applicable to threaded tubular connections.

Further, International patent applications WO 00/14441 and WO 00/14442 describe threaded connections that comprise a groove in the threads to reduce the stiffness of the thread structure with the aim of reducing the makeup torque. Those documents disclose no mode of the groove itself that can improve the resistance of the threaded connections to cyclic stresses.

SUMMARY OF THE INVENTION

The present invention seeks to produce a male or female threaded element for threaded tubular connections, which is particularly resistant both to:

a) static stresses, in particular axial tension, axial compression, flexion, torsion, internal or external pressure, jump-out during makeup, either alone or in combination (for example tension+internal pressure);

b) cyclic tension-compression stresses or flexion stresses by reducing load transfer in the first and last engaged thread zones and by minimising stress concentration factors (SCF) in those zones.

The present invention also seeks to provide a threaded element that can be produced with all types of threadings: tapered, straight, straight-tapered combinations, in one or more steps, with radially interfering threads and/or with flanks in contact; threads in contact via their 2 flanks with the corresponding flanks of the mating thread are, for example, of the type known as "rugged thread" described in EP 0 454 147, of the axial interference fit type described in WO00/14441 or of the variable width wedge type as described in United States reissued patent U.S. Re-30 647.

The present invention also seeks to provide a threaded element that can easily be produced and inspected.

The threaded element of the invention must be capable of being used to make threaded tubular connections intended for hydrocarbon production strings, casing strings or for risers, or intended for similar uses.

The invention also seeks to provide threaded tubular connections that have a particularly good seal, in particular to gas, even under cyclic stresses.

The invention also seeks to provide a threaded element that can be employed to constitute drillpipe strings.

The present invention also seeks to provide a threaded tubular connection in which one or two threaded elements have been modified to resist cyclic stresses.

The male or female threaded element of the invention is produced at the end of a pipe and comprises an external male threading or an internal female threading depending on whether the threaded element is a male threaded element or a female threaded element.

It is intended to be connected to a mating threaded element (i.e., female if the threaded element under consideration is male and vice versa) to constitute a threaded tubular connection that is resistant to cyclic stresses.

The threading is constituted by at least one threaded portion. When the threading comprises a plurality of threaded portions, these can be spaced from each other axially and/or radially, for example in stepped threaded portions.

The or each threaded portion of the threading comprises three zones of substantially identical length, starting from the front end of the threaded element: a zone termed first engaged thread zone, a zone termed medial thread zone and a zone termed last engaged thread zone, the definition of the first and last engaged threads corresponding to that indicated above in the prior art.

Certain of these zones can comprise partial height threads such as run-in or run-out threads.

A helical groove is produced substantially radially in the threads of at least a fraction of the axial length of at least one threaded portion, the groove opening into the thread crest, defining either side of the groove a load half-thread and a stabbing half-thread respectively on the load flank side and on the stabbing flank side. The groove can, however, only partially open into the thread crest.

In accordance with one characteristic of the invention, in each threaded portion where it is formed, the groove is formed over all or a portion of the threads of one or two end zones, namely the first engaged thread zone and the last engaged thread zone and it can optionally be produced in the threads of the medial thread zone; the geometrical characteristics of the groove are such that they reduce the stiffness of the threads with grooves in the end zone or zones with respect to the stiffness of the threads in the medial thread zones.

The stiffness of the grooved threads is determined by the flexion and/or shear ability of the stressed half-threads, which are generally the load half-threads taking into account the axial tensile stresses to which threaded tubular connections are generally subjected; the same inventive concept can, however, be adapted to stabbing half-threads when these are stressed or are also stressed, for example in threaded tubular connections operating in compression.

The stiffness of a thread is defined as the coefficient of proportionality between the axial load transferred by the thread under consideration to the corresponding thread of a mating threaded element of a threaded tubular connection, and the axial deformation undergone by the thread under consideration.

In a threaded tubular connection, the groove of the invention reduces, with respect to a similar threaded tubular connection with non grooved threads, the axial load transfer between the threads of the zone or zones of threads in which the groove is formed and the corresponding threads of the mating threaded element by redistributing the overall axial load between the different engaged threads of the threading; this significantly improves the resistance of the threaded tubular connection to dynamic stresses, in particular flexion, superimposed on static stresses in axial tension.

Since in a threaded tubular connection, the first engaged threads of a threaded element co-operate with the last engaged threads of the mating threaded element, disposing a groove either at the level of the first engaged threads of each of the two threaded elements or at the level of the last engaged threads or both at the same time on one only or both threaded elements produces the same technical effect of equalising the load transfer per thread in the first and last threads of the threaded portions in which the groove is produced with respect to the load transfer per thread in the medial thread zone.

The groove can also be produced in all or a portion of the threads of the medial thread zone provided that it further reduces the stiffness of the threads with the groove in the end zone or zones over the stiffness of the threads in the medial thread zones.

It is then possible to improve or even optimise all the threads of the threaded portion in which a groove is formed and of the corresponding threaded portion of the mating threaded element of a threaded tubular connection.

It should be noted that the groove of the invention can also reduce stresses on the threads of the first or second engaged thread zones generated by errors in the pitch between the male and female threads of a threaded tubular connection, the pitch error resulting from tolerances in the threading manufacture.

It can also limit dangerous overpressures caused by greasing and lubricating the threads on makeup.

Preferably, the groove is produced in the threads of the first engaged thread zone and optionally in the threads of the medial thread zone and it does not affect the threads in the last engaged thread zone which remain solid, to reduce the stiffness of the threads in the first engaged thread zone compared with the stiffness of the threads in the medial thread zone.

The inventors have shown in this case that the groove of the invention would reduce the maximum value of the stress concentration coefficient (SCF) of the wall section at the mating thread root, the SCF being a relative dimension obtained by relating the maximum stress at the location under consideration to the stress in the corresponding pipe body. The groove of the invention thus reduces the maximum stress in the wall at the thread root of the last engaged thread zone of the mating threading, which wall is in this thread zone subjected to the overall axial tensile load on the threaded tubular connection and thus reduces the risk of fatigue crack initiation at that location.

Thus, the threaded elements of a threaded tubular connection can be used with large cyclic variations in load without modifying the axial tension performance.

Preferably, the groove is obtained using a forming tool on the threads of the threaded portion under consideration. This means that its form is defined by the profile of the forming tool and that its depth, measured from the thread crest to the groove bottom, is defined by the penetration depth of the forming tool in the threads.

Preferably, the stiffness of the threads increases steadily because of the groove from the end engaged thread of the end zone or zones with a groove going towards the medial thread zones.

The end engaged thread of an end zone is the first engaged thread when the groove is produced in the threads of the first engaged thread zone and the last engaged thread when the groove is produced in the threads of the last engaged thread zone. Thus, both the first and last engaged threads are involved when the groove is formed in both the threads of the first engaged thread zone and the last engaged thread zone.

Advantageously, the depth of the groove reduces, preferably regularly, from the end engaged thread of the end zone or zones with a groove going towards the medial thread zone.

Alternatively or supplementarilly, the groove has a helical pitch that is different from that of the threaded portion in which it is formed.

Preferably, the envelope of the groove bottoms is a conical surface that is coaxial with the axis of the threaded element.

In a variation, the envelope of the groove bottoms is a surface of revolution that is coaxial with the axis of the threaded element and with a non rectilinear generatrix such as a toric surface, a parabolic surface or a hyperboloid or a composite surface of a plurality of surfaces of revolution connected to each other end to end.

In one or more of these variations, when the groove is produced in the first engaged thread zone, the slope of the generatrix of the envelope of the corresponding groove bottoms is preferably greater than the slope of the threaded portion in which the groove is implanted, whether the latter slope is positive (tapered threadings) or zero (straight threadings). It is preferably lower than that of the threaded portion when the groove is produced in the last engaged thread zone.

Advantageously, to allow engagement of the male threaded element in the female threaded element under good conditions, the groove does not open onto the stabbing flanks when the threads are generally trapezoidal in shape.

Advantageously again, the threaded element can comprise an abutment with an abutting surface that is constituted by the front end of the threaded element and which is under axial compression.

Since the groove is formed at the level of the first engaged threads and reduces the axial stiffness thereof, it can advantageously accumulate an absolute deformation of the axial compression in the abutment at the end of makeup of the threaded connection constituted with a threaded tubular connection.

When the threading is separated from the front end of the threaded element by a relatively short or non-existent lip, the groove can increase the axial length that is effectively deformed by compression compared with a similar prior art threaded element and can thus accumulate a higher absolute deformation in the abutment. When seeking an optimum seal, there is frequently advantage in having a short lip when a sealing surface is produced at the peripheral end of the lip.

In a variation, the threaded element can comprise a first abutment the surface of which is constituted by the front end of the element under consideration and a second abutment disposed in a co-operating manner on a made up threaded tubular connection with an abutment at the front end of a mating threaded element. In this case, the presence of groove (s) on the threaded elements can advantageously allow both of the abutments of the threaded element under consideration to be in bearing contact against two corresponding abutments of the mating threaded element.

Such a bearing pair is normally rendered difficult in prior art threaded tubular connections unless the two abutments are very accurately and expensively produced one with respect to the other, or the lips are extended, with discouraging effects. The increase in the effective length of axial compression of the abutments by the grooves means that this double bearing can be more readily produced than on a prior art threaded tubular connection with two sets of abutments.

BRIEF DESCRIPTION OF THE DRAWINGS

Other advantages will become apparent from the embodiments described below and from the accompanying drawings.

DESCRIPTION OF THE PREFERRED EMBODIMENTS

Figure 1:
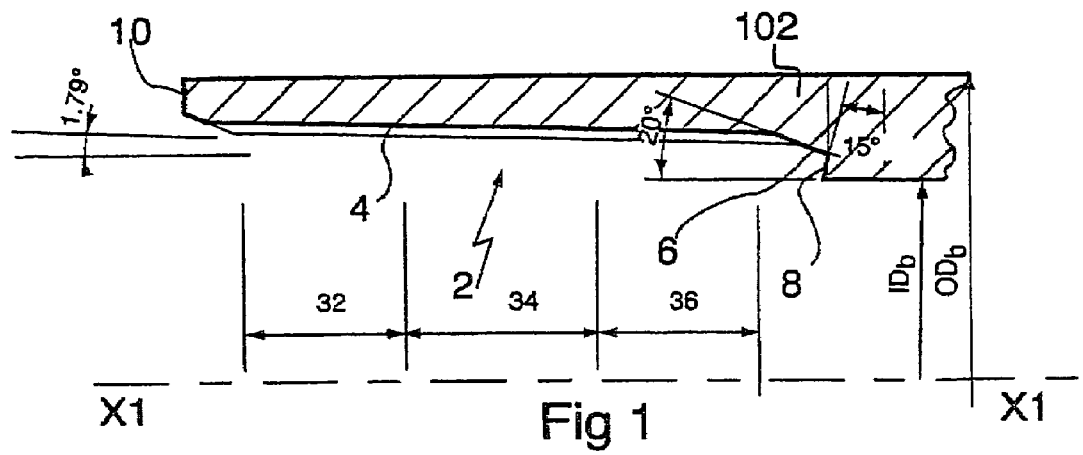
FIG. 1 is a diagrammatic representation of an axial half cross-section of a female threaded element of a threaded tubular connection of the invention.

FIG. 1 shows a female threaded element 2 disposed at the end of a pipe 102.

Pipe 102 can be a great-length pipe, i.e., about 10 m or more in length, or a coupling a few tens of centimeters in length, only half shown in FIG. 1. In the first case, the female threaded element 2 can produce an "integral" threaded connection; in the second case, a threaded and coupled connection is produced.

The inside of the female threaded element 2 comprises, from its front end 10, a female threading 4 composed of a single threaded portion, a sealing surface 6 and an abutment 8.

The female sealing surface 6 is a conical surface inclined at 20° to the axis X1X1 of threaded element 2.

Abutment 8 is a substantially transverse surface and more particularly it is slightly convexly conical and forms an internal shoulder on threaded element 2.

The female threading 4 is tapered with a peak half angle of 1.79° (taper=6.25%) with trapezoidal threads 12.

Threading 4 comprises a first engaged thread zone 32 constituted by the first six threads of the front end side 10 of the threaded element, a last engaged thread zone 36 constituted by the six threads from the penultimate female thread and a medial thread zone 34 comprising six threads between zones 32 and 36.

Figure 7:
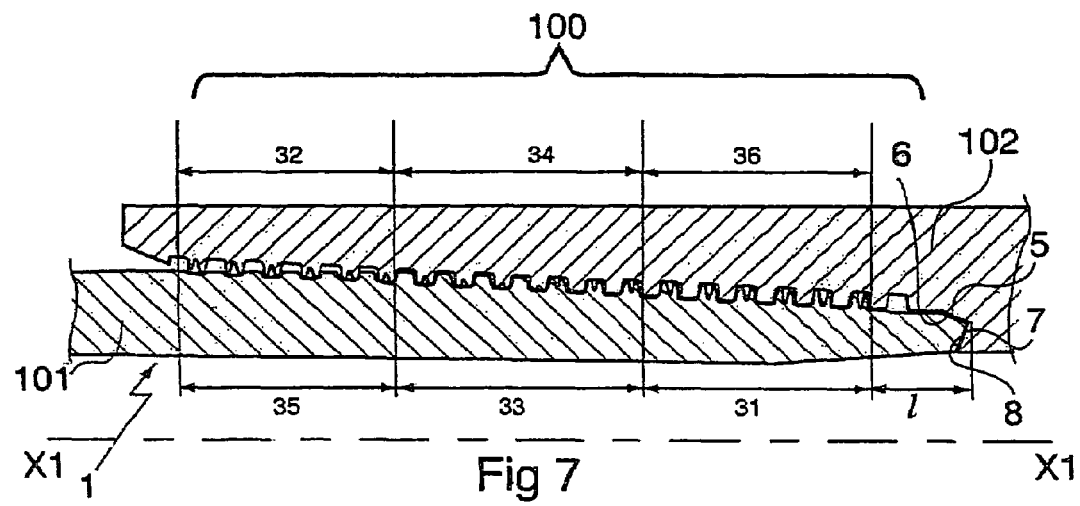
FIG. 7 shows an axial half cross-section of a threaded tubular connection of the invention obtained after makeup of the threaded elements of FIGS. 1 to 4.

The last thread of the threading is not designed to be an engaged thread (see FIG. 7).

The number of threads in zones 32 and 36 of the first and last engaged threads corresponds to ⅓ of the total number of engaged threads.

Figure 3:
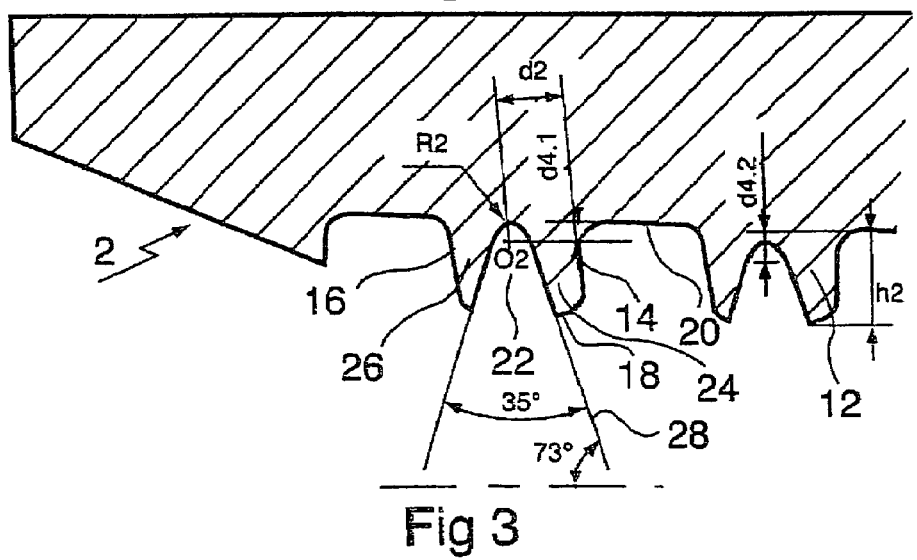
FIG. 3 shows a detail of the first engaged threads of the female threaded element of FIG. 1.

As shown in detail in FIG. 3, the female threads 12 generally comprise a thread crest 18, a thread root 20, a stabbing flank 16 turned towards the front end 10 of the threaded element and a load flank 14 on the opposite flank.

A helical groove 22 is machined in threads 12 using a forming tool 42 that is independent of the cutting of threads 12.

This forming tool 42 is in the form of an inverted rounded V defined by an angle of 35° between the arms of the V and a rounded top with a radius of 0.4 mm.

Tool 42 is positioned to cut the threads substantially radially from the thread crest in the shape of a V with a rounded bottom and leaving two half-threads either side of the tool, a load half-thread 24 on the load flank 14 side and a stabbing half-thread 26 on the stabbing flank 16 side, without cutting into the thread flanks.

Figure 2:
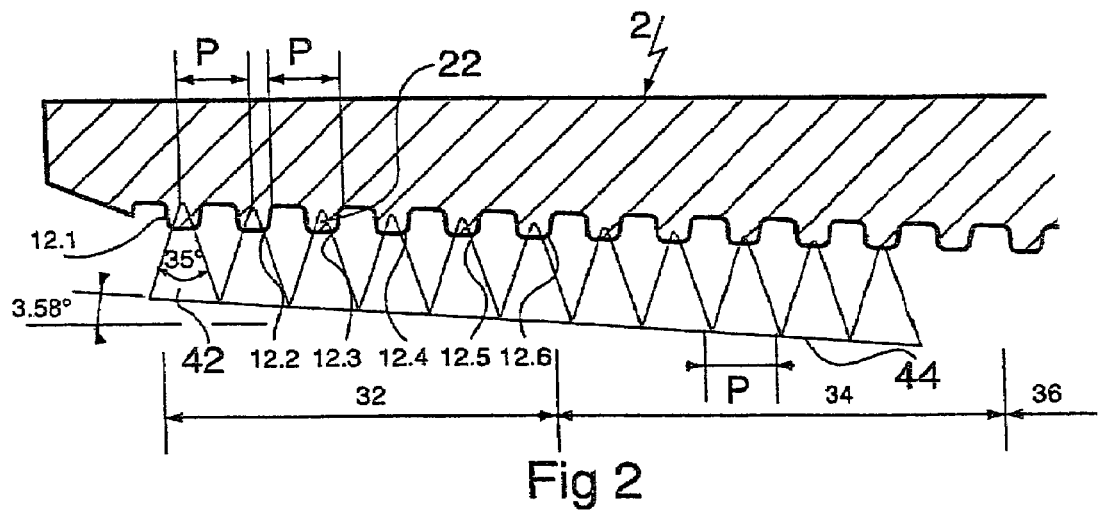
FIG. 2 shows the threading of the threaded element of FIG. 1 with the threads during the course of machining.

The forming tool 42 is displaced as shown in FIG. 2 from the first thread 12.1 following a helix with a pitch p identical to the pitch of the female threading 4, the base of the tool bearing on a conical surface the generatrix of which is seen at 44. This conical surface has a taper that is twice that of threading 4 (angle of 3.58° between generatrix 44 and the axis of the threaded element) so that the depth of groove 22 steadily reduces from the first engaged thread 12.1 and becomes zero at the eleventh thread 12.11 and beyond to the last thread.

Groove 22 can reduce the stiffness of the threads in first engaged thread zone 32 compared with the stiffness of the threads in medial thread zone 34.

Once made up, since the threads 12 are subjected to contact pressure on the load flanks 14, their stiffness is determined by the ability of the load half thread 24 to flex, in particular by dint of its geometry.

This geometry can be characterized by the inclination of the load flank 14 and the flank of groove 28 compared with the axis of the threaded element, by distance d2 between the load flank 14 and centre $O_2$ of the rounded zone of the groove bottom and by the distance d4 between the point $O_2$ and the envelope of the thread roots. Since the pitch of the helix of groove 22 is the same as that of threads 12, distance d2 varies only very slightly from one thread to the next.

Because of the greater slope of generatrix 44 with respect to that of the threading, distance d4 increases continuously from the first thread 12.1 so that d4.1<d4.2<d4.3 and so on.

This means that the stiffness of the female threads 12 is a minimum at the threads in first engaged thread zone 32 and a maximum at the groove-free threads of the last engaged thread zone 36 and of medial thread zone 34; the stiffness of the female threads 12 of first engaged thread zone 32 is also less than that of the threads with shallow grooves in medial thread zone 34.

The stiffness of the threads increases steadily with the reduction in the groove depth from the first engaged thread 12.1 (end thread) going towards the medial thread zone 34.

The distance d4.1 is slightly greater than the radius R2 of the bottom of the groove so that at no time does the groove bottom extend beyond the envelope of the thread roots with no groove.

However, it is possible to produce, to no great disadvantage, a groove that cuts the envelope of the roots of the first threads (for example d4.1=0) provided that the critical cross section of the threaded element 2 (which in service supports all of the axial load on threaded element 2) is situated at the last thread which has no groove.

In contrast, when a groove is formed in the last engaged thread zone, the bottom of the groove formed must not extend outside the volume included within the envelope of the bottoms 20 and that of the thread crests 18 if the service performance of the threaded tubular connection including the threaded element 2 is not to deteriorate.

Figure 4:
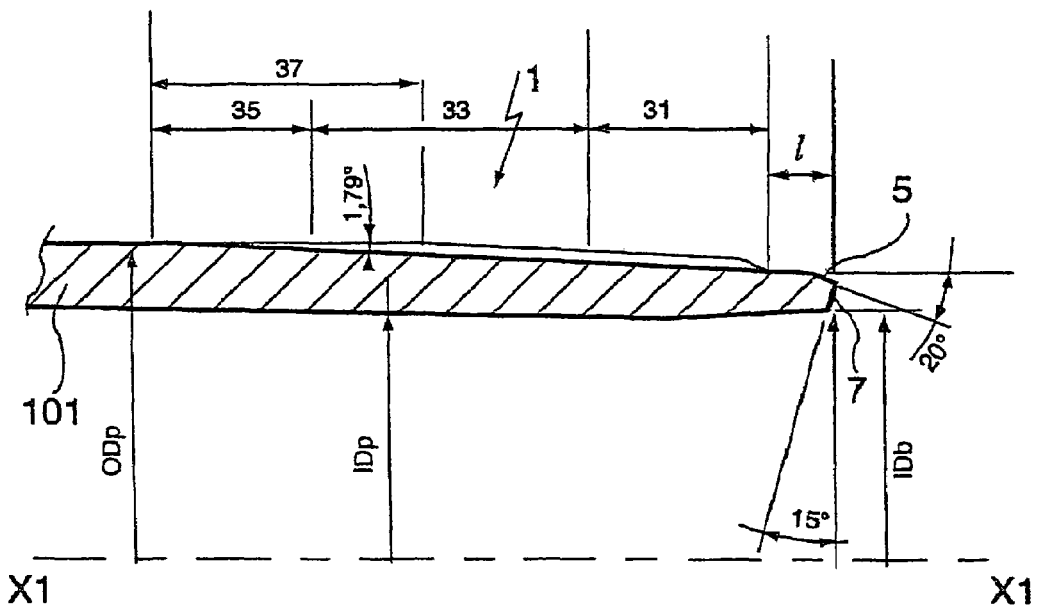
FIG. 4 is a diagrammatic representation of an axial half cross-section of a male threaded element of the invention adapted to the female threaded element of FIG. 1.

FIG. 4 shows a male threaded element 1 disposed at the end of a great-length pipe 101.

The exterior of threaded element 1 comprises, from its front end 7 forming an abutment, a sealing surface 5 and a male threading 3.

Abutment 7 is a slightly conical concave surface intended to co-operate with the abutment 8 on female threaded element 2.

Sealing surface 5 is a conical surface inclined at 20° to the axis X1X1 of threaded element 1 and co-operates with female sealing surface 6.

Male threading 3 is composed of a single threaded portion; it is tapered and adapted to co-operate with female threading 4.

It comprises eighteen trapezoidal engaged threads 11, the last eight threads with reference numeral 37 being incomplete in height (threads termed "vanishing" or "run-out" threads.

The first six threads constitute the first engaged element zone 31, the first thread being chamfered on the front end to facilitate engagement.

The last six threads, all run-out threads, form last engaged thread zone 35.

The six intermediate threads form medial thread zone 33.

Figure 6:
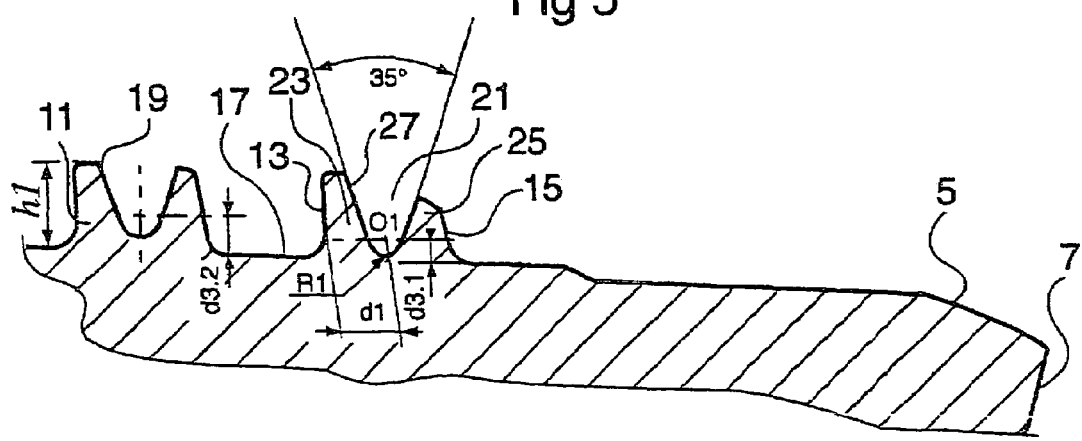
FIG. 6 shows a detail of the first engaged threads of the male threaded element of FIG. 4.

As was the case for the female threads, male threads 11 comprise a thread crest 19, a thread root 17, a stabbing flank 15 turned towards the front end 7 of the threaded element and a load flank 13 on the opposite flank (see FIG. 6).

A helical groove 21 is machined in threads 11 using a forming tool 41 (similar to that used to machine groove 22 in female threads 12); the groove is machined independently of the cutting of threads 11.

The forming tool 41 cuts the threads substantially radially from the thread crest leaving two half-threads either side of it, a load half-thread 23 on the load flank side and a stabbing half-thread 25 on the stabbing flank side, without cutting into the thread flanks.

Figure 5:
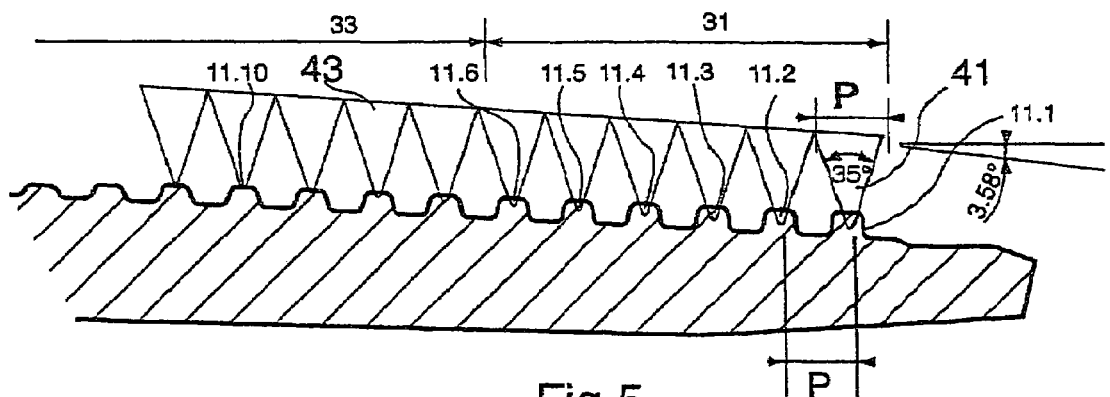
FIG. 5 shows the threading of the male threaded element of FIG. 4 with the threads during the course of machining.

The forming tool 41 is displaced as shown in FIG. 5 along a helix with pitch p that is identical to the pitch of the male threading 3, the base of the tool bearing on a conical surface with generatrix 43.

This conical surface has a taper that is twice that of threading 3 (i.e., an angle of 3.58° between generatrix 43 and the axis of threaded element 1) so that the depth of groove 21 steadily reduces from the first engaged thread 11.1 to become zero at the $10^{th}$ thread 11.10.

Groove 21 can reduce the stiffness of the threads in first engaged zone 31 with respect to the stiffness of the medial thread zone 33.

As was the case for the female threads, the stiffness of the male threads is determined by the geometry of the load half-thread 23 and in particular by the inclination of the load flank 13 and the groove flank 27 with respect to the axis of the threaded element, by the distance d1 between the load flank 13 and the centre $O_1$ of the rounded zone of the bottom of the groove and by the distance d3 between the point $O_1$ and the envelope line of the thread roots.

The pitch of the helix of groove 21 is the same as that of threads 11, the distance d1 varying only slightly from one thread to the next.

Because of the greater slope of the generatrix 43 with respect to that of the threading, distance d3 increases continuously from the first thread 11.1 so that we have: d3.1<d3.2<d3.3 and so on.

This means that the stiffness of the male threads 11 is a minimum at the threads of the first engaged thread zone 31 and a maximum at the groove-free threads in the last engaged thread zone 35 and the medial thread zone 33; the stiffness of the male threads 11 of first engaged thread zone 31 is also lower than that of the threads with shallow grooves in the medial thread zone 33.

The stiffness of male threads 11 increases steadily with the reduction in depth of the groove from the first engaged thread 11.1 to the tenth thread in medial thread zone 35.

The distance d3.1 is slightly higher than the radius R1 of the groove bottom (0.4 mm) so that the groove bottom never extends beyond the envelope of the thread roots but, as was the case of the female threads, a groove could be formed that cut the envelope of the roots of the first threads.

However, a groove must not be formed in the last engaged thread zone wherein the bottom extends beyond the volume included within the envelope of the bottoms 17 and that of the thread crests 19, the critical cross-section of the male threaded element being located at the level of the last engaged thread.

FIG. 7 shows the threaded tubular connection 100 constituted by making up the threaded elements 1 and 2 of FIGS. 1 and 4 to the specified makeup torque.

The conical male sealing surface 5 radially interferes with the conical female sealing surface 6 and the male abutment 7 is forced to bear against the female abutment 8.

In reaction to the axial compressive stresses between abutments, the load flanks 13, 14 of the male and female threads bear against each other and develop contact pressures.

Further, the female thread crests 18 radially interfere with the roots of the male threads 17 while there remains a clearance between the male thread crests 19 and the female thread roots 20.

FIG. 7 shows the engaged threads and the position of grooves 21 and 22 in the first engaged thread zones 31, 32 and in a fraction of the medial thread zone 33, 35.

Figure 12:
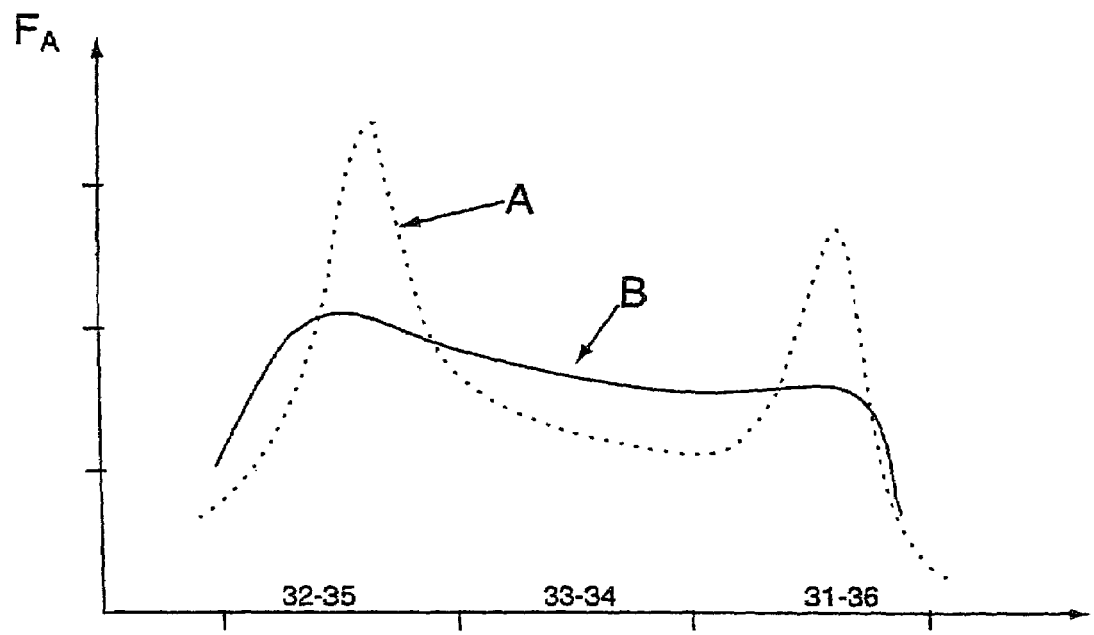
FIG. 12 diagrammatically shows the change in load transfer between the threads of a standard threaded tubular connection and of a threaded tubular connection of the invention.

FIG. 12 shows the axial load transfer $F_A$ per thread between the engaged male and female thread load flanks on threaded tubular connections stressed by axial tension under a load such that the body of pipe 101 is stressed to 80% of the yield strength of the material (80% PBYS).

Curve B relates to the threaded tubular connection of FIG. 7 of the invention, while curve A relates to a similar standard threaded tubular connection but without a groove.

Curve A (standard threaded tubular connection) has a dished appearance; load transfer peaks at the first and last engaged threads; the medial thread zones 33, 34 cannot therefore be used to their full load transfer capacity.

Curve B (threaded tubular connection of FIG. 7) shows a much more uniform load transfer thanks to grooves 21, 22 which reduce the stiffness of the first engaged threads.

This curve shows that the threaded tubular connection of FIG. 7 demonstrates excellent behaviour both as regards static stresses (mechanical strength, seal) and as regards dynamic stresses (resistance to initiation of fatigue cracking).

A similar effect can be obtained with a groove produced in the last engaged threads or at both the first and last engaged threads. In the case of a groove produced in the last engaged thread zone, the slope of the generatrix of the envelope of the groove bottoms should, of course, be lower in this zone than that of the threaded portion to obtain the reducing effect on the thread stiffness.

The external loads on the threaded elements of a threaded tubular connection and the stresses resulting from makeup result in a stress field that may have a maximum in the junction radius at the thread root between the load flank and the thread root.

It is convenient to determine a stress concentration coefficient (SCF) for each thread at this location by expressing it in terms of the stress in the pipe body 101 and in particular to define the stress concentration coefficient in accordance with International standard ISO 13628-7CD1:

$$SCF = (\sigma_{principal\ thread}(T_{max}) - \sigma_{principal\ thread}(T_{min})) / (\sigma_{pipe\ body}(T_{max}) - \sigma_{pipe\ body}(T_{min}))$$

$T_{min}$ and $T_{max}$ are the loads corresponding to a stress in the pipe body 101 in axial tension, for example 0 and 80% of the yield strength;

$\sigma_{principal\ thread}$ is the highest of the three principal stresses on an elemental cube of material taking into account both the stresses from makeup and those to which the threaded tubular connection is subjected (axial tension+alternating flexion, for example);

$\sigma_{pipe\ body}$ is the stress on the pipe body 101 such that the denominator of the SCF in the selected example is 80% of the effective yield strength of the pipe under consideration.

Figure 13:
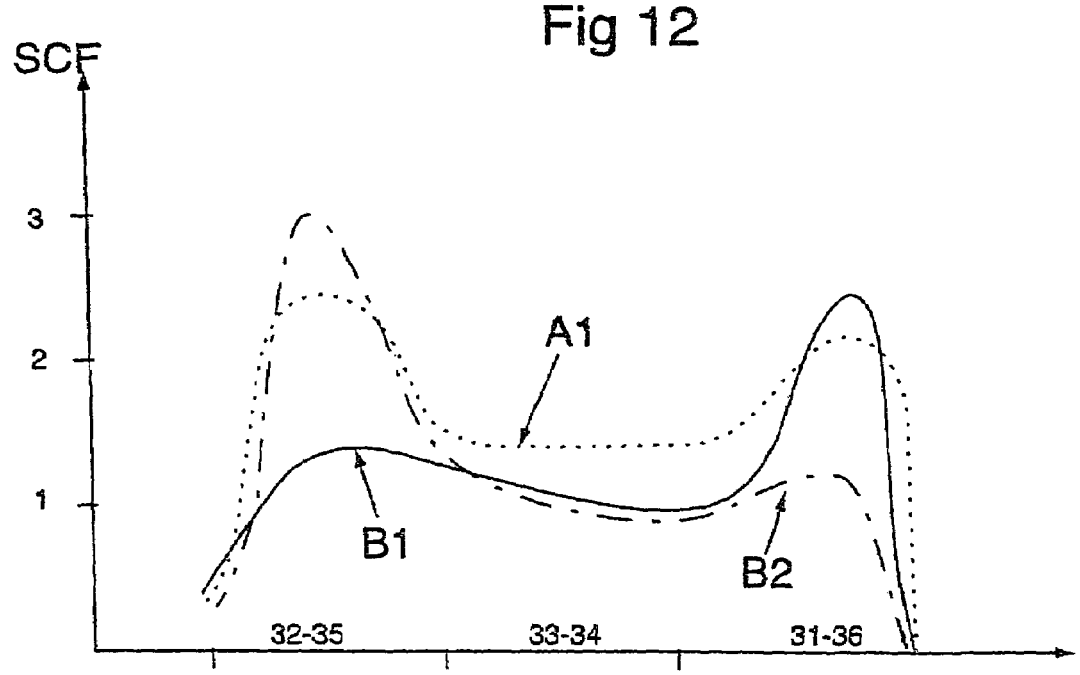
FIG. 13 diagrammatically shows, in the same manner as FIG. 12, the change in the stress concentration coefficient at the thread root for the male threading and for the female threading.

FIG. 13 shows values of SCF on the side of the male threaded element (curves A1 and B1) and on the side of the female threaded element (curve B2), curve A1 relating to a standard threaded connection and curves B1 and B2 relating to a threaded connection of the invention (FIG. 7).

The importance of the groove on the fatigue behaviour is apparent in curves A1 and B1 of FIG. 13: compared with a prior art threaded tubular connection (curve A1), groove 22 (curve B1) reduces the SCF peak at the male last thread zone to increase the value of the SCF peak in the zone of the first male threads; but this peak is not very deleterious as regards fatigue as the wall of the male threaded element at the first male thread zone is not very stressed in axial tension while the wall of the male threaded element at the level of the last male thread zone must tolerate the overall axial tension load on the threaded element.

Groove 21 acts in a similar manner on the shape of the SCF curve regarding the female threads, the wall of the female threaded element at the first female threads being in compression because of abutments 7, 8; curve B2 of FIG. 13 is to be compared with a curve with an appearance similar to curve A2 in the same figure.

The above reasoning can also be directly applied in the case of combined external stresses: static axial tension and internal static pressure and cyclic flexion, as an example. It can also be applied to cases in which the threaded elements are stressed in axial compression by adapting the disposition of the groove (stabbing half-threads stressed rather than load half-threads).

Figure 8:
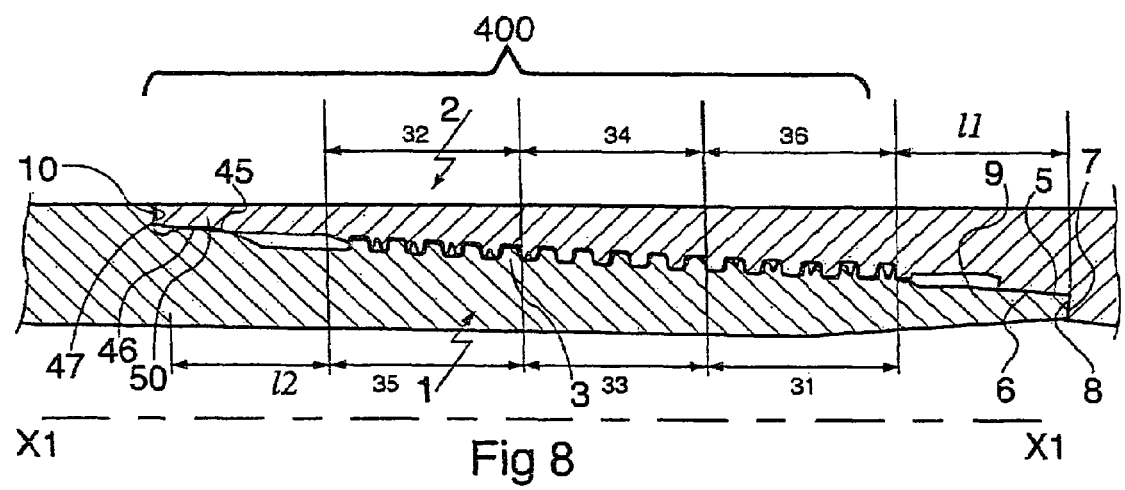
FIG. 8 shows an axial half cross-section of a variation of the threaded tubular connection of the invention.

FIG. 8 shows a variation in a threaded tubular connection for risers comprising, in addition to a set of internal sealing surfaces 5, 6 as is the case for FIG. 7, a set of external sealing surfaces 45, 46 to prevent external or internal fluid from ingress.

In addition to the internal abutments 7, 8 shown in FIG. 7 (principal abutments), the threaded connection of FIG. 8 comprises external abutments constituted by the front end surface 10 of the female threaded element and by a corresponding annular surface 47 on the male threaded element.

The male and female threadings 3, 4 are entirely similar to those of FIG. 7, with a groove with a decreasing depth affecting the threads of the first female thread to the tenth female thread and of the first male thread to the ninth male thread and procuring the same technical effect of reducing the stiffness of the thread and reducing the maximum SCF values.

The grooves also permit greater functional flexibility of the external and internal abutments.

The deep groove produced in the first male threads and the low stiffness thereof increases the effective length over which the male lip 9 is compressed at the end of makeup: lip 9 is then compressed over a length that is longer than its length and for the same admissible stress level, it is possible to make up the threaded tubular connection still further and give more energy to the sealing surfaces 5, 6.

Such a technical effect may already be advantageous for threaded tubular connections with a single set of abutments of the type shown in FIG. 7 but it is even more advantageous in the case of threaded tubular connections with two sets of abutments as shown in FIG. 8.

It is difficult to synchronise the action of two sets of abutments apart from machining these two sets extremely accurately and therefore expensively.

The large deformation capacity of male lip 9 and female lip 50 enables not only the principal abutments (internal in the present case) but also the auxiliary abutments (external in the present case) to function in abutment in all mating scenarios between the male threaded element and the female threaded element, even when the distance between the two male abutments is a maximum and that between the two female abutments is a minimum.

It is possible to obtain a similar technical effect by extending the lips 9, 50 but this would reduce the compactness of the threaded tubular connection, which is not desired, and would ruin its sealing power: if lips 9, 50 were too flexible, an insufficient contact pressure would be induced between sealing surfaces 5, 6, 45, 46.

Figure 9:
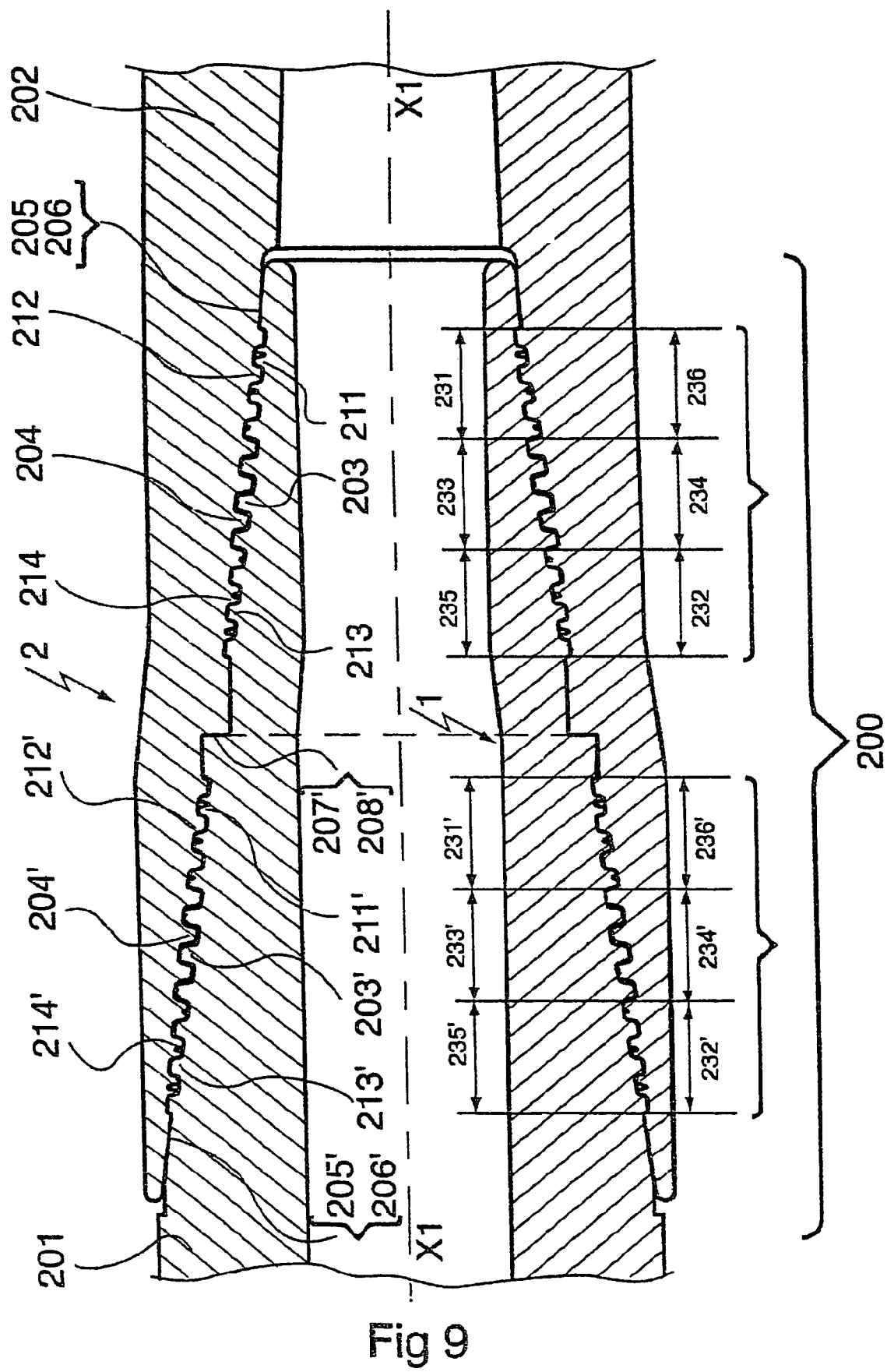
FIG. 9 shows an axial half cross-section of a further variation of the threaded tubular connection of the invention.

FIG. 9 shows a further variation in the threaded connection of the invention which comprises, as in U.S. Pat. No. 5,687, 999, male and female tapered threadings, each with two threaded portions 203, 203', 204, 204' that are radially and axially apart from each other and separated by a central set of abutments 207, 208.

Each tapered threaded portion comprises a fraction of run-in threads 211, 211', 214, 214' in which the envelope of the thread roots is truncated parallel to the axis of the threaded element and a fraction of run-out threads 212, 212', 213, 213' in which the thread crests are truncated parallel to the axis of the threaded element.

Each threaded portion comprises nine threads, all engaged, delimiting first engaged thread zones 231, 231', 232, 232', last engaged thread zones 235, 235', 236, 236' and medial thread zones 233, 233', 234, 234', each zone comprising three threads.

As shown in FIG. 9, a groove is machined in the first four male threads and the first four female threads of each threaded portion to a depth that reduces from the first engaged thread to the fourth engaged thread.

The technical effect of the grooves is the same over each threaded portion as in the case of the threaded connection of FIG. 7 with threadings in a single threaded portion and reduces the value of the SCF at the root of the last engaged threads of each threaded portion.

Figure 10:
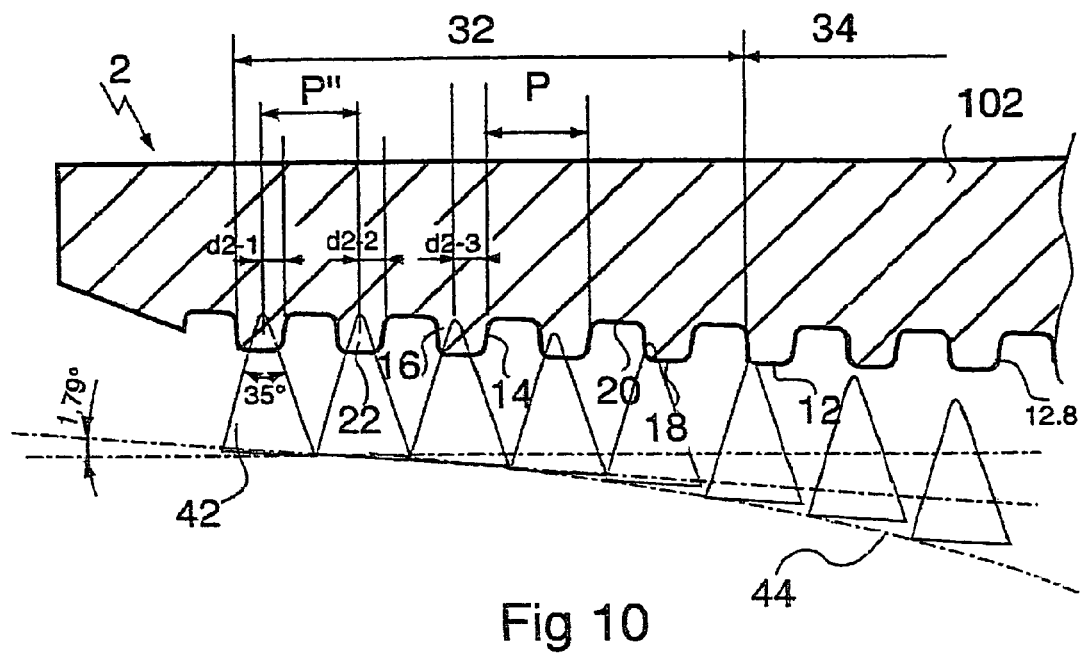
FIG. 10 shows a detail of the first engaged threads of a variation of the female threaded element of the invention.

FIG. 10 shows a variation in the female threaded element of FIGS. 1 to 3.

In FIG. 10, a groove is machined into the threads with a pitch p" that is smaller than the pitch p of the threading so that the distance d2 to the load flank increases from the first female engaged thread: d2.1<d2.2<d2.3.

At least over the first threads, the base of the forming tool 42 for machining the groove is displaced over a conical surface with the same taper as the female threading so that the depth of the groove is substantially constant over these first threads.

The distance d2.1 is such that the groove does not open onto the load flank.

After machining the groove over three thread pitches, the tool is retracted, its base following a curve 44 which is, for example, an arc of a circle or a hyperbola and describes a toric surface or a hyperbola of revolution, so that that the groove does not open onto the stabbing flank, which could deleteriously affect the mutual engagement of the male threadings and the female threadings.

The slope of the curve 44 beyond the third thread is greater than that of the threading to obtain the desired retraction.

Figure 11:
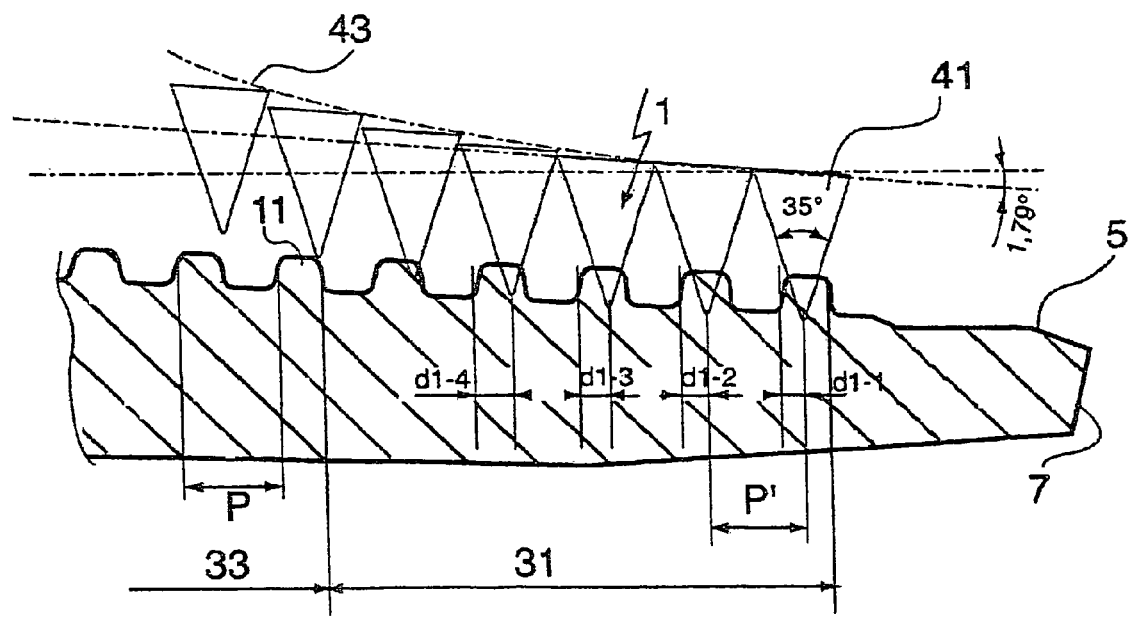
FIG. 11 shows a detail of the first engaged threads of a variation of the male threaded element of the invention.

The same technical effect of stiffness reduction of the first engaged threads is obtained with the female threaded element of FIG. 11 as with those of FIGS. 1 to 3.

FIG. 11 shows a variation in the male threaded element of FIGS. 4 to 6 in which a groove is machined as shown in FIG. 11 with a pitch p' that is smaller than the pitch p of the threading and to an identical depth over the first threads.

The distance d1 from the groove to the load flank increases from the first male engaged thread: d1.1<d1.2<d1.3.

The base of the tool 41 for machining the groove, and as a result the tool and its point, follow a composite surface of revolution: the base is firstly displaced along a conical surface with the same taper as that of the male threading, then it follows a toric surface or a hyperboloid of revolution described by the generatrix 43 the slope of which is greater than that of the threading.

As was the case for FIG. 10, this can achieve a reduction in the stiffness of the first engaged threads without cutting into the stabbing flank of the male threads.

Many other variations and embodiments that have not been described in the present document are included in the scope of the invention as claimed.

By way of non limiting example, the groove can be produced in any threading type (straight, tapered, straight-tapered) with any thread type (radially interfering, "rugged thread" of the type described in EP 0 454 147, variable width wedges, with axial interference fit) or any general thread form (trapezoidal, rounded triangular); the grooves may have a U profile; the groove bottom may describe a toric surface or a hyperbola of revolution from the first thread, the groove may be produced both with a variable pitch and variable depth.

The thread flanks, in particular the load flank and/or the stabbing flank, can also be convexly bowed so as to control the contact characteristics (location, pressure) between the corresponding flanks in spite of the variation in the stresses when in operation.

The junction zones between the flanks and thread roots can also have a plurality of portions with different radii of curvature to minimise the SCF.

The peripheral surface of the threaded element opposite to that in which the threading is formed can also comprise a waist in the form of a groove produced at the level of the threading to reduce the residual wall thickness under the threading of the first engaged threads.

Particularly in the case of "rugged thread", wedge or axial interference fit threads in which the two thread flanks can be subjected to contact pressures of varying intensity, it is possible to exploit the technical effect of a groove with a pitch equal to that of the threading but with a variable depth: such a groove reduces the stiffness of the threads both on the load flank side and on the stabbing flank side and improves the fatigue behaviour of the threaded tubular connection in cyclic tension, in cyclic compression, in tension-compression or in alternating flexion at the same time.

The invention claimed is:

1. A threaded element of a threaded tubular connection comprising:
    a threading with at least one threaded portion, each threaded portion comprising, starting from an end of the at least one threaded portion located on a side of a front end of the threaded element, a first engaged thread zone with at least three threads of substantially constant width, a medial thread zone having a plurality of threads with said substantially constant width, and a last engaged thread zone with at least three threads of said substantially constant width;
    a helical groove formed substantially radially to at least partially open at a thread crest, wherein the groove is formed in said at least three threads of one or both of the first engaged thread zone and the last engaged thread zone, and geometrical characteristics of the groove reducing a stiffness of at least the at least three threads of substantially constant width and having the groove in one or both of the first and last engaged thread zones compared with a stiffness of the threads in the medial thread zone having said substantially constant width such that the stiffness of the threads in said medial zone with said substantially constant width is greater than the stiffness of the at least three threads of substantially constant width in the one or both of the first and last engaged thread zones and having the groove.

2. A threaded element according to claim 1, wherein the groove is formed in the threads of the first engaged thread zone and optionally in the threads of the medial thread zone, the threads of the last engaged thread zone remaining solid.

3. A threaded element according to claim 1, wherein the groove has a profile obtained by penetration to a given depth of a forming tool into the threads of the at least one threaded portion.

4. A threaded element according to claim 1, wherein the groove has a profile of a V with a rounded bottom.

5. A threaded element according to claim 1, wherein the groove is formed in the last engaged thread zone, and a bottom of said groove is located in a volume of the last engaged thread zone located between an envelope of the thread roots and an envelop of the thread crests.

6. A threaded element according to claim 1, wherein the geometrical characteristics of the groove are such that the stiffness of the threads having said groove increases steadily from an end engaged thread of one or both of the first and last engaged thread zones towards the medial thread zone.

7. A threaded element according to claim 6, wherein the groove has a depth that reduces regularly from the end engaged thread of one or both of the first and last engaged thread zones towards the medial thread zone.

8. A threaded element according to claim 6, wherein the groove has a helical pitch that is different from that of the threads of the threaded portion in which the groove is formed.

9. A threaded element according to claim 7, wherein an envelope of groove bottoms of said groove with said depth that reduces regularly is a conical surface coaxial with the threaded element.

10. A threaded element according to claim 7, wherein an envelope of groove bottoms of said groove with said depth that reduces regularly is a surface of revolution coaxial with the threaded element and with a non-rectilinear generatrix.

11. A threaded element according to claim 9, wherein the groove is formed in the first engaged thread zone such that a slope of the generatrix of the envelope of the groove bottoms is greater than a slope of the threaded portion in which the groove is formed.

12. A threaded element according to claim 1, wherein the threads have a generally trapezoidal form and the groove does not open onto a stabbing flank of the threads.

13. A threaded element according to claim 1, wherein the threading comprises at least two threaded portions, and wherein the groove is produced in each of the at least two threaded portions.

14. A threaded element according to claim 1, further comprising a single abutment, an abutment surface of which comprises a front end of the threaded element.

15. A threaded element according to claim 1, further comprising:
    an external abutment, an abutment surface of which comprises a front end of the threaded element, and
    an internal abutment, wherein both of the external and internal abutments are configured to bear against corresponding abutments of a mating threaded element.

16. A threaded element according to claim 1, further comprising at least one sealing surface configured for radial interference with a sealing surface on a mating threaded element.

17. A threaded tubular connection comprising:
    a male threaded element at an end of a first pipe and a female threaded element at an end of a second pipe, at least one of the two threaded elements being a threaded element according to claim 1.

18. A threaded element according to claim 1, wherein the groove is not formed in the threads of the medial thread zone.

19. A threaded element according to claim 18, wherein the groove in the threads of one or both of the first and last engaged thread zones has a depth that reduces regularly towards the medial thread zone.

20. A threaded element according to claim 19, wherein the groove in the threads of the first engaged thread zone has a depth that reduces regularly towards the medial thread zone.

21. A threaded element according to claim 20, wherein the groove in the threads of the last engaged thread zone has a depth that reduces regularly towards the medial thread zone.

22. A threaded element according to claim 1, wherein the groove is formed in the threads of the first and last engaged thread zones and not in the threads of the medial thread zone.

23. A threaded element according to claim 1, wherein the groove is formed in the threads of the first engaged thread zone and not in the threads of the medial thread zone.

24. A threaded element according to claim 23, wherein the groove in the threads of the first engaged thread zone has a depth that reduces regularly towards the medial thread zone.

25. A threaded element according to claim 1, wherein the groove is formed in the threads of the last engaged thread zone and not in the threads of the medial thread zone.

26. A threaded element according to claim 25, wherein the groove in the threads of the last engaged thread zone has a depth that reduces regularly towards the medial thread zone.

27. A threaded tubular connection comprising:
a male threaded element at an end of a first pipe and a female threaded element at an end of a second pipe, each of the male and female threaded elements being a threaded element according to claim 1.

28. A threaded tubular connection according to claim 27, wherein the groove is formed in the threads of the first engaged thread zone of the male element and not in the threads of the last engaged thread zone of the female element, wherein said last engaged thread zone of the female element engages with said first engaged thread zone of the male element when said threaded tubular connection is made-up.

29. A threaded tubular connection according to claim 28, wherein the groove is formed in the threads of the first engaged thread zone of the female element and not in the threads of the last engaged thread zone of the male element.

30. A threaded tubular connection according to claim 29, wherein the groove is not formed in the threads of the medial thread zone of the male and female elements.

31. A threaded tubular connection according to claim 27, wherein the groove is formed in the threads of the first engaged thread zone of the female element and not in the threads of the last engaged thread zone of the male element, wherein said last engaged thread zone of the male element engages with said first engaged thread zone of the female element when said threaded tubular connection is made-up.

32. A threaded element according to claim 1, wherein the threaded element is male and said threading is an external male threading.

33. A threaded element according to claim 1, wherein the threaded element is female and said threading is an internal female threading.

34. A threaded element according to claim 1, wherein the groove is formed in the threads of the medial thread zone having said substantially constant width.

35. A threaded element according to claim 34, wherein the medial thread zone has at least three threads having said substantially constant width.

36. A threaded element according to claim 1, wherein the groove is formed in the threads of the first engaged thread zone and in the threads of the last engaged thread zone.

37. A threaded element according to claim 36, wherein the groove is formed in a first thread of the first engaged thread zone, wherein said threaded element is free of any thread in a portion between said threading and said front end of the threaded element, and wherein said first thread has said substantially constant width.

38. A threaded element according to claim 36, wherein the groove is formed in a last thread of the last engaged thread zone, wherein said threaded element is free of any thread in a portion between said threading and a back end of the threaded element, and wherein said last thread has said substantially constant width.

39. A threaded element according to claim 1, wherein the groove is formed in the threads of the first engaged thread zone and not in the threads of the last engaged thread zone.

40. A threaded element according to claim 39, wherein the groove is formed in a first thread of the first engaged thread zone, wherein said threaded element is free of any thread in a portion between said threading and said front end of the threaded element, and wherein said first thread has said substantially constant width.

41. A threaded element according to claim 40, wherein said at least three threads of said first engaged thread zone have a substantially constant depth and said first thread has said substantially constant width.

42. A threaded element according to claim 1, wherein said at least three threads of said first engaged thread zone have a substantially constant depth, said groove is formed in said at least three threads of said first engaged thread zone, and a depth of said groove in said at least three threads of said substantially constant depth decreases toward said medial thread zone.

43. A threaded element according to claim 1, wherein said at least three threads of said last engaged thread zone have a substantially constant depth, said groove is formed in said at least three threads of said last engaged thread zone, and a depth of said groove in said at least three threads of said substantially constant depth decreases toward said medial thread zone.

44. A threaded element according to claim 1, wherein all threads have said substantially constant width such that said threading is free of any thread that does not have said substantially constant width.

* * * * *

UNITED STATES PATENT AND TRADEMARK OFFICE
CERTIFICATE OF CORRECTION

PATENT NO. : 7,513,534 B2 Page 1 of 1
APPLICATION NO. : 10/469839
DATED : April 7, 2009
INVENTOR(S) : Noel et al.

It is certified that error appears in the above-identified patent and that said Letters Patent is hereby corrected as shown below:

On the title page, Item (30), The Foreign Application Priority Data is incorrect. Item (30) should read:

Item -- (30)  Foreign Application Priority Data

Mar. 9, 2001   (FR)................................01/03249 --

Signed and Sealed this

Twenty-sixth Day of May, 2009

JOHN DOLL
*Acting Director of the United States Patent and Trademark Office*